United States Patent [19]

Cahn

[11] 3,812,786

[45] May 28, 1974

[54] CONVEYOR APPARATUS

[76] Inventor: Robert L. Cahn, 257 Grand Central Ave., Amityville, N.Y. 11701

[22] Filed: Apr. 18, 1972

[21] Appl. No.: 245,136

[52] U.S. Cl.................. 104/88, 104/131, 104/121
[51] Int. Cl............................................. B61j 3/00
[58] Field of Search....... 104/48, 88, 130, 131, 118, 104/119, 121, 172 R, 172 C; 105/141, 144, 146, 147; 198/38; 186/1 R, 3, 15, 19, 20

[56] References Cited
UNITED STATES PATENTS
2,824,654  2/1958  Baume.......................... 214/16.1 CE
3,040,871  6/1962  Lombard............................. 198/38
3,356,040  12/1967  Fonden............................... 104/130
3,366,199  1/1968  Cahn................................... 186/1 R
3,557,973  1/1971  Bussienne............................ 104/48
3,659,529  5/1972  Jacobs................................. 104/88

Primary Examiner—M. Henson Wood, Jr.
Assistant Examiner—D. W. Kern
Attorney, Agent, or Firm—Edward H. Loveman

[57]  ABSTRACT

Conveyor apparatus for receptacles comprising an assembly of vertical and horizontal tracks with the horizontal tracks disposed at different elevational levels. A drive means moves receptacle holders along the tracks and electromechanical switching devices shift the receptacle holders between the vertical and horizontal tracks.

9 Claims, 6 Drawing Figures

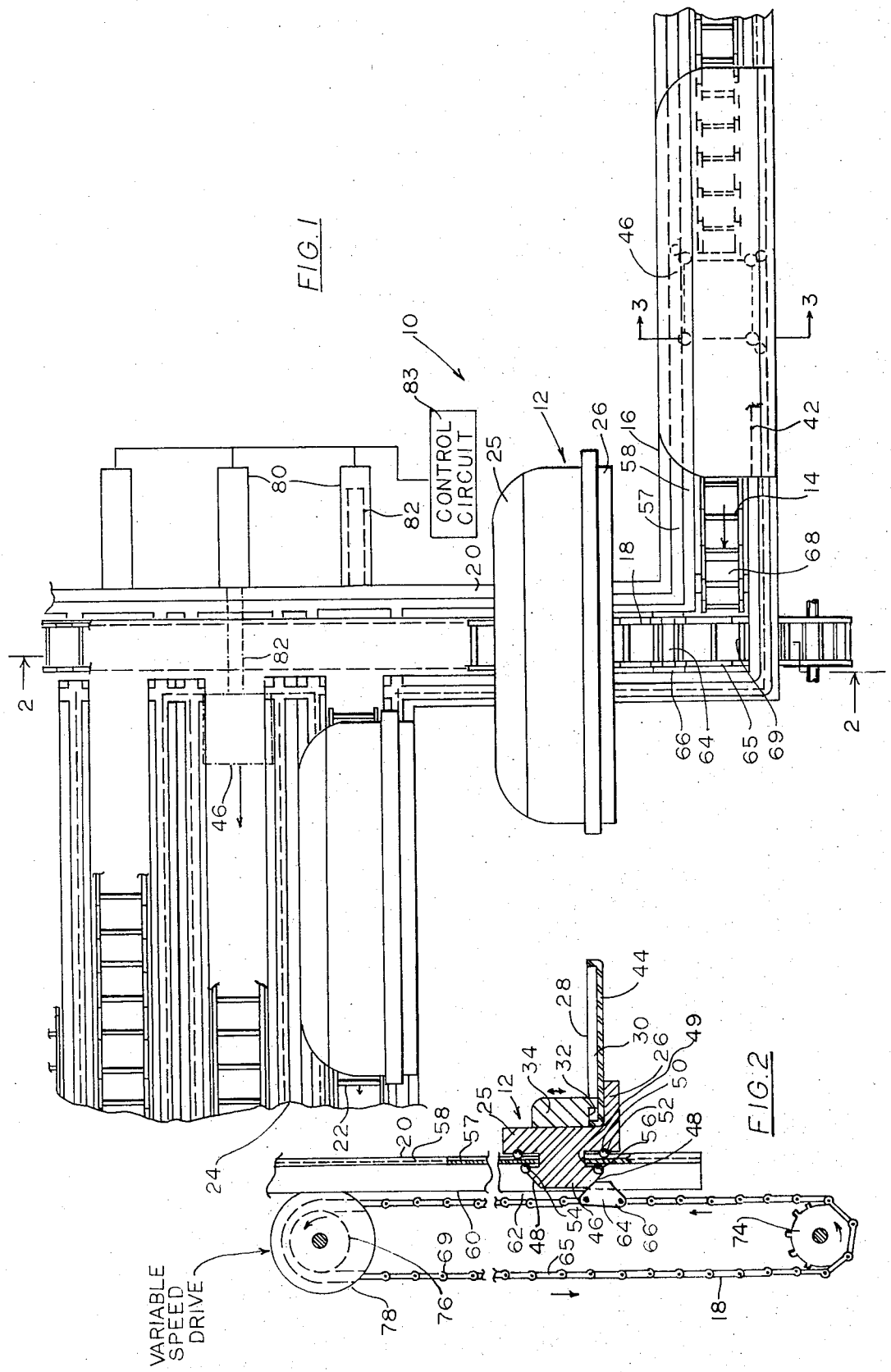

CONVEYOR APPARATUS

This invention relates to a conveyor apparatus and more particularly concerns a conveyor apparatus for maintaining a receptacle in a horizontal position while being transported horizontally and vertically.

The invention involves improvements over these described in my prior U.S. Pat. Nos. 3,295,635 and 3,366,199 and my copending U.S. application Ser. No. 55,525 filed July 16, 1970 now U.S. Pat. No. 3,655,031.

In the prior conveyor systems it was necessary to provide means for pivoting parts of receptacle or tray holders to permit the trays to move along an inclined or curved track between different elevational levels. The inclined portions of track occupied considerable space. The present invention is directed at simplifying the receptacle holders to eliminate the pivotable parts, eliminating the curved or inclined portions of trackways, and simplifying the driving mechanism for the receptacle holders.

According to the present invention, the receptacle holder has a one-piece structure. If the system is designed to carry trays or other small objects the holder may be provided with a movable front clamping jaw. Tracks sections are disposed at right angles and the receptacle holders can move either vertically or horizontally driven by separate drives. Each receptacle holder has a rear flange which may be engaged by a power driven coupler to move in either vertical or horizontal direction. A control mechanism which may include a switching apparatus and a logic circuit is used to shift the drive of the receptacle holders from vertical to horizontal tracks and vice versa.

It is therefore a principal object of the invention to provide an improved conveyor system with receptacle holders movable only in vertical or horizontal directions.

A further object of the present invention is to provide an improved conveyor system with a receptacle holder having an integral flange engageable by driving members of a power coupler.

Another object of the present invention is to provide an improved conveyor system having switching means to shift a receptacle holder from vertical to horizontal tracks and vice versa.

Another object of the present invention is to provide an improved conveyor system with vertical and horizontal tracks arranged at right angles, without any inclined or curved section joining tracks at different levels.

These and other objects and many of the attendant advantages of this invention will be readily appreciated as the same becomes better understood by reference to the following detailed description when considered in connection with the accompanying drawings in which:

FIG. 1 is a front elevational view, partially diagrammatic of part of a conveyor system embodying the present invention;

FIG. 2 is an enlarged sectional view taken along line 2—2 of FIG. 1, portions being omitted;

Figure 3:
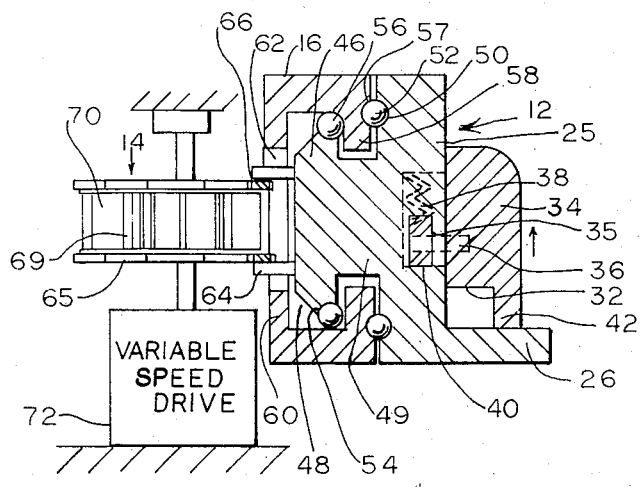
FIG. 3 is an enlarged sectional view taken along line 3—3 of FIG. 1.

Referring, now to the drawings wherein like reference characters designate like or corresponding parts throughout, there is illustrated in FIG. 1 a conveyor system or apparatus generally designated as reference numeral 10 in which a receptacle holder such as a tray holder 12 is movably carried by a drive chain 14 in a horizontal track 16 by a drive chain 18 in a vertical track 20, and by drive chains 22 in any one of a plurality of horizontal tracks 24 at different elevational levels.

Figure 4:
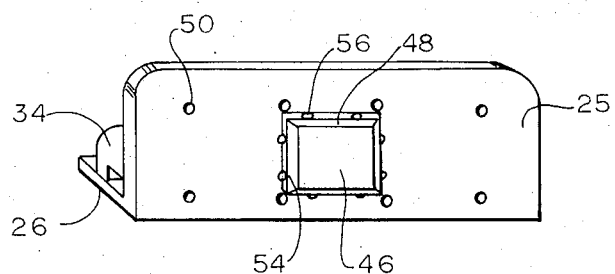
FIG. 4 is a reduced rear perspective view of a receptacle holers.

Each tray holder 12 is generally L-shaped in cross section and includes a vertical wall 25 and a horizontal forwardly projecting platform or ledge 26 integral therewith on which a tray 28 may be removably mounted; see FIGS. 1 and 4. The receptacle or tray holder 12 has a peripheral upstanding rim 30 (FIG. 2) which engages in a recess 32 formed in the bottom of a vertically movable clamping bar or plate 34. The clamping bar 34 is joined to vertical slide rods 35 via pins 36 which are slideable in a slot (not shown). Springs 38 in recesses 40 engage the rods 35 and urge them downwardly along with the bar 34 in well known manner. A flange 42 of the clamping bar 34 bears on the platform 26 in the absence of the tray 28 and bears on the bottom 44 of the tray 28 when the tray is inserted under the bar 34 in any one of the tray holders 12.

According to the invention a rectangular flange 46 is integrally joined with a wall 25 of the tray holder 12 by a rectangular neck 49. The flange 46 extends rearwardly from the back of the wall 25 and has four beveled edges 48. Recesses 50 (FIGS. 3 & 4) formed in the back of the wall 25 receive ball bearings 52 (FIG. 3). Recesses 54 formed in the periphery of the flange 46 receive ball bearings 56. The ball bearings 52 and 56 ride along opposite sides of spaced rails 58 forming opposing parts of the channel shaped tracks 16, 20 and 24. The flange 46 slides along inside the track as best shown in FIGS. 2 and 3. The ball bearings 52 ride in grooves 57 at the front of the guide rails 58.

The back wall 60 of each track is formed with a slot 62 through which extends lugs 64 carried by certain links 66 of the chains 14, 18, and 22. The endless chains 14 and 22 are horizontal and are entrained at opposite looped ends on a pair of sprockets 68, 70. The sprocket 70 is driven by a variable speed drive motor 72. (see FIG. 3). The vertical chain 18 is entrained on a pair of sprockets 74, 76 and is driven by a variable speed drive motor 78 at the sprocket 76. Each of the links 65 of the respective chains is connected to an adjacent link by a pin 69.

At spaced intervals along the vertical track 20 is an electrically operated solenoid 80 having a plunger 82 which can be selectively projected inwardly of the track 20 through a lateral hole to switch the tray holders moving in the vertical track 20 to any selected one of the horizontal tracks. The solenoids are connected to an electrical control circuit 83 for selectively energizing the solenoids.

Figures 5, 6:
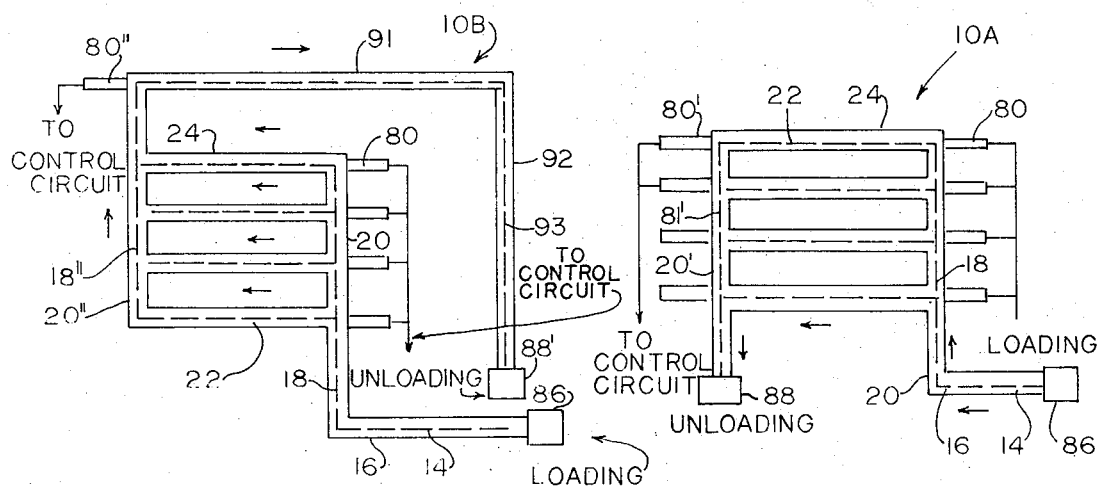
FIGS. 5 and 6 are diagrams of two different conveyor track arrays according to the invention.

FIG. 5 shows schematically a track system 10A including the horizontal tracks 16, 24, the vertical track 20, the drive chains 14, 18, 22, track switching solenoids 80, 80' and respective spaced tray loading and unloading positions 86, 88. The vertical track 20' is similar to the track 20 with a vertical drive chain 18' for carrying the tray holders down to the unloading position 88 at the bottom end of the track 20'.

FIG. 6 shows schematically a track system 10B in which the tray holders move in an endless loop, starting at the loading position 86 and terminating at an unloading position 88'. A vertical track 20'' has a vertical chain 18'' which carries the tray holders up to a higher level where a horizontal track 90 receives the tray holders and a chain 91 carries them to a vertical track 92. The tray holders then descend on a vertical chain 93 at the vertical track 92 to the unloading position 88' just above the loading position 86.

In the operation of all of the systems described, the motive power for driving the tray holders is provided by a source of power (not shown) which drives the variable speed motors and in turn drives the power coupler or chain drives. As each tray holder is switched from a horizontal to a vertical track or vice versa, the driving lugs or projections from the driving chain is disengaged from one beveled edge 48 of flange 46 on the tray holder being driven, and the flange 46 is reengaged on an adjacent beveled edge by the driving lugs of the succeeding driving chain. One of the solenoids 80, 80', 80'' is required to be in the "on" position in switching from a vertical to a horizontal track. At all times the trays carried by the tray holders remain in horizontal position. Pivotable vertical wall parts employed in prior types of tray holders are eliminated. The overall length of the track system is less than in prior conveyor systems since inclined or curved transition sections between various elevational levels are eliminated. Transfer from one horizontal level to another takes place along the vertical track located at the ends of the horizontal track. Selective switching is accomplished electro-mechanically by electrically operated solenoids connected in a control circuit which may include a logic circuit for transfering the holders to different preselected levels. If desired the switching may be accomplished by conventional well known hydraulic or pneumatic apparatus.

The several conveyor systems may be designed to accomodate as many tray holders 12 as desired. The receptacle or tray holders may be made in appropriate sizes and configurations for holding food and utensils or any other apparatus. The conveyor systems can be installed in airplanes for efficiently serving passengers and for clearing away soiled trays and dishes. Although the embodiment disclosed shows tray holders it should be understood that the receptacle holder may be a platform or a hook to carry an automobile, etc. Moreover, the power coupler, need not be a chain, but may be by way of a cable, or rope, etc. The conveyor system may be installed in restaurants, hospitals, production lines in a factory or in any other location where a plurality of serving points are located between a loading and an unloading position.

It should be understood that the foregoing relates to a limited number of preferred embodiments of the invention, which have been by way of example only and that it is intended to cover all changes and modifications of the examples of the invention herein chosen for the purposes of the disclosure, which do not constitute departures from the spirit and scope of the invention.

The invention claimed is:

1. Conveyor apparatus comprising
   an assembly of vertical and horizontal tracks directly connected to each other, said horizontal tracks being disposed on different elevational levels
   a plurality of receptacle holders movably mounted on said tracks each of said receptacle holders having flange means with mutually perpendicular edges on the rear side thereof
   a power coupling means on each of said vertical and horizontal tracks for moving said receptacle holders along the respective track said coupling means including a projecting means arranged to engage at least one of said edges of said receptacle holders and thereby move said receptacle holders along the respective track; and
   means for moving said receptacle holders selectively between said vertical and said horizontal tracks.

2. Conveyor apparatus as defined in claim 1 wherein each of said tracks comprise channel shaped members with spaced coplanar opposing rails at the front side of said tracks, said flange means of each of said receptacle holders being disposed inside one said members and slidably guided by said front rail thereof.

3. Conveyor apparatus as defined in claim 1, wherein said means for moving said receptacle holders between said vertical and said horizontal tracks comprise a switch means and a control means for operating said switch means.

4. Conveyor apparatus as defined in claim 3 wherein said switch means comprise a plurality of electromechanical switches and said control means include a logic circuit for transferring each of said holders to preselected horizontal tracks.

5. Conveyor apparatus as defined in claim 1 wherein said receptacle holders comprises an upright plate and includes a clamping means at the front side of said plate.

6. Conveyor apparatus as defined in claim 5 wherein each of said tracks comprise channel shaped members with spaced coplanar opposing rails at the front side of said tracks, said flange means of each of said receptacle holders being disposed inside one of said members and slidably guided by said front rail thereof.

7. Conveyor apparatus as defined in claim 6 wherein said means for moving said receptacle holders between said vertical and said horizontal tracks comprise a switch means and a control means for operating said switch means.

8. Conveyor apparatus as defined in claim 7 wherein said switch means comprise a plurality of electromechanical switches and said control means include a logic circuit for transferring each of said holders to preselected horizontal tracks.

9. Conveyor apparatus as defined in claim 7 further comprising bearing means at opposite sides of said rails rotatably engaged with said plate and flange respectively of each receptacle holder to facilitate sliding movement of said receptacle holder along said tracks.

* * * * *